United States Patent [19]

Piretti

[11] Patent Number: 5,118,020

[45] Date of Patent: Jun. 2, 1992

[54] SLEEVE AND HOLD DOWN FOR BIKE RACK SUPPORT ARMS

[75] Inventor: Giancarlo Piretti, Bologna, Italy

[73] Assignee: Graber Products, Inc., Green Bay, Wis.

[21] Appl. No.: 587,410

[22] Filed: Sep. 25, 1990

[51] Int. Cl.$^5$ ............................................. B60R 9/00
[52] U.S. Cl. .............................. 224/324; 224/42.03 B; 224/314; 224/321; 224/329
[58] Field of Search ............... 224/329, 330, 324, 314, 224/321, 42.03 B; 248/499; 211/17, 18, 21, 22

[56] References Cited

U.S. PATENT DOCUMENTS

| | | |
|---|---|---|
| 4,394,948 | 7/1983 | Graber . |
| 4,452,385 | 6/1984 | Prosen . |
| 4,513,897 | 4/1985 | Graber . |
| 4,830,250 | 4/1989 | Newbold et al. ............... 224/314 |

Primary Examiner—Linda J. Sholl
Attorney, Agent, or Firm—Fuller, Ryan & Hohenfeldt

[57] ABSTRACT

A sleeve for a support arm for a bike rack is formed of a soft rubber or plastic and has recesses to position bike frames. A longitudinal groove in the top of the sleeve positions a shock cord in a storage mode. A knob on the end of the shock cord interfits in an end piece which holds the sleeve on the support arm.

6 Claims, 5 Drawing Sheets

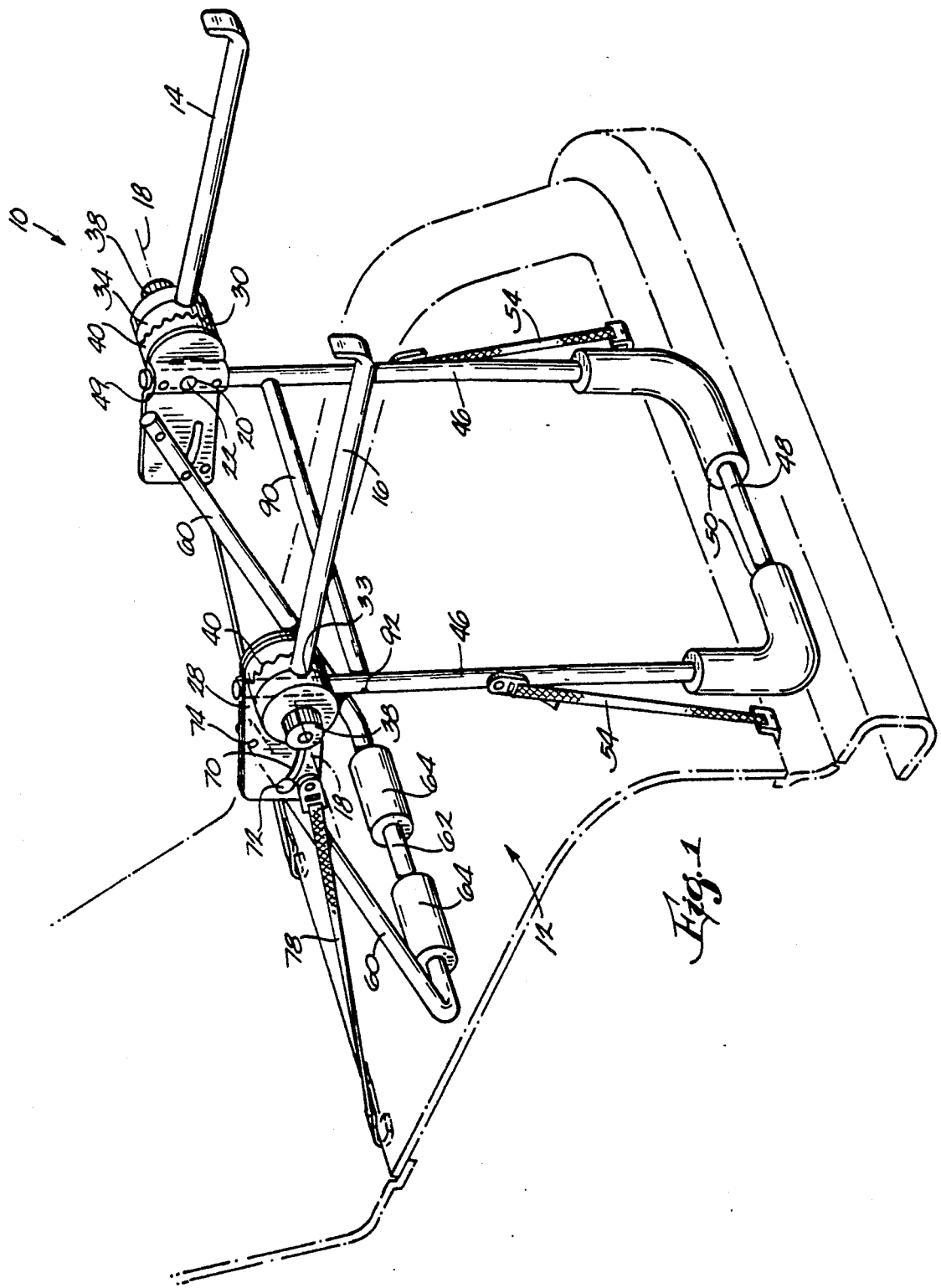

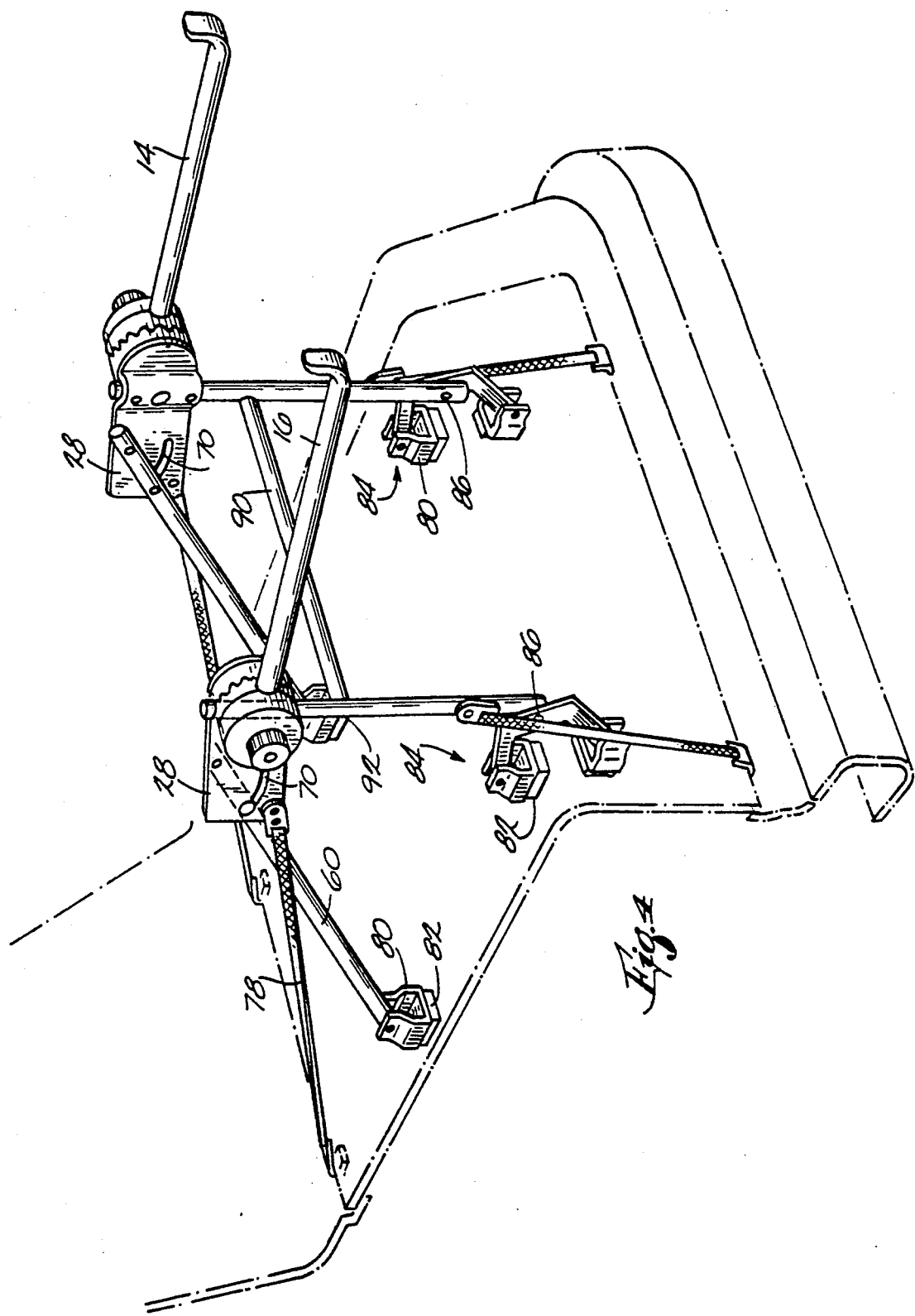

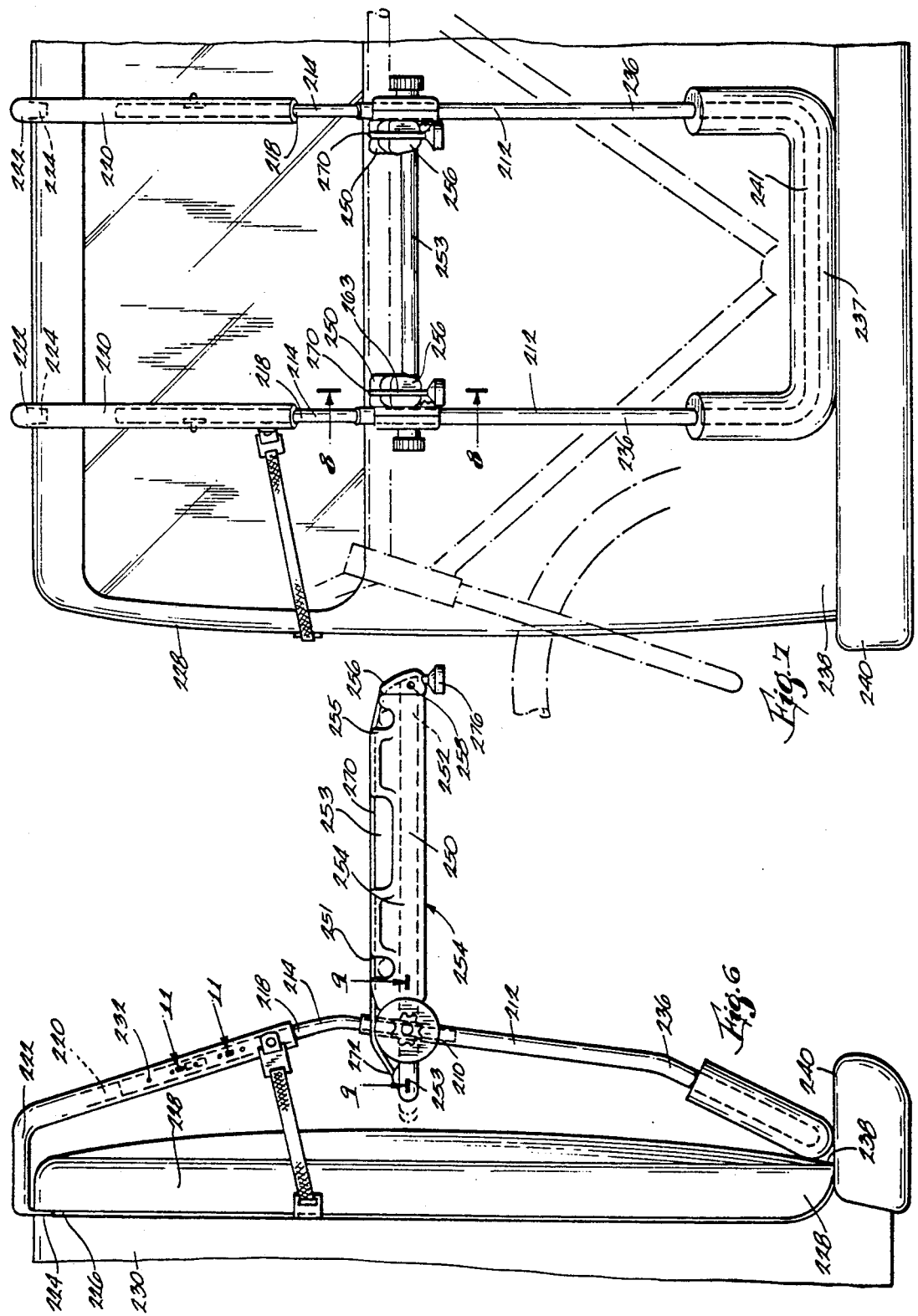

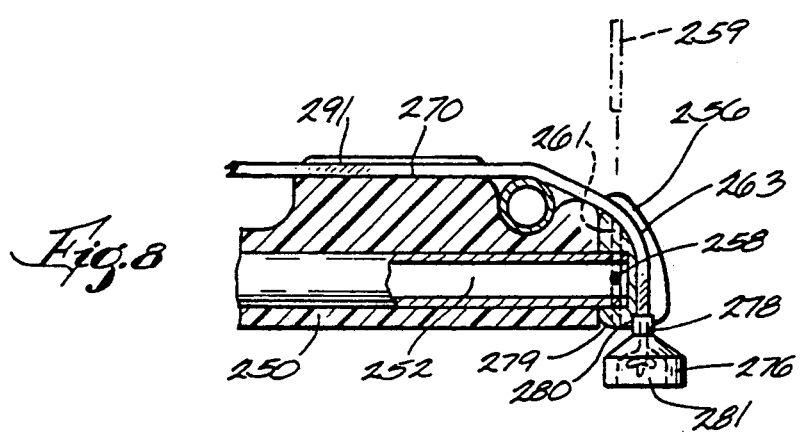
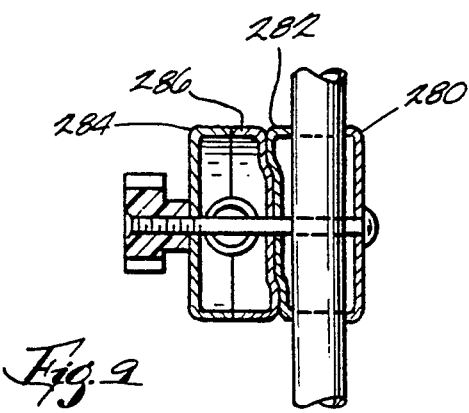
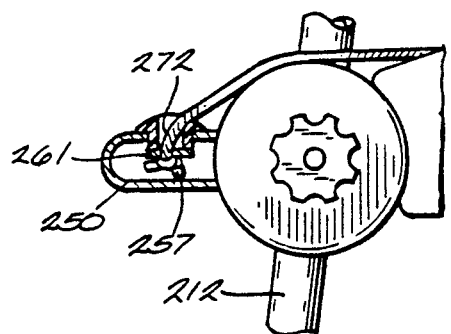
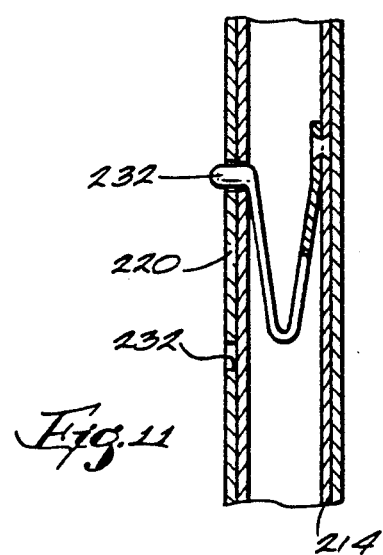

SLEEVE AND HOLD DOWN FOR BIKE RACK SUPPORT ARMS

FIELD OF THE INVENTION

The invention relates to bike carriers for a vehicle.

BACKGROUND OF THE INVENTION

The various carriers of the invention disclosed herein are particularly adapted for supporting the heavier bikes such as the mountain bikes. Various accessory bike racks have been developed. U.S. Pat. Nos. 4,394,948; 4,513,897; 4,452,385; and 4,830,250 are examples of prior art patents on bike racks. All of these patents have at least two support frames with each support frame made up of two legs. The '385 patent has front and rear legs in a fixed relationship whereas the other patents mentioned above have some range of angular adjustment between the legs to accommodate different shaped trunks or rear extremities of the vehicles. The '897 and '948 patents have forward legs which are fixed to side plates. Rear legs which engage the rearmost portion of the vehicle have a range of angular adjustment provided by slots in the plates and rivets in the legs which move in the slots. U.S. Pat. No. 4,830,250 discloses the use of two U-shaped support frames and two support arms all of which are rotatably supported from a common axis and all of which can be adjusted at the same time when the locking nuts are loose. Although the carrier disclosed in the '250 patent provides a compact folded package, it is difficult to manipulate both the legs and the support arms because all parts are loose at the same time. The legs are not locked in a fixed relationship when adjusting the angle of the support arms to horizontal and the legs can easily slip from the adjusted position. Heretofore, the prior art has not provided a support arm cushion or sleeve which cooperates with an elastic tie down which cooperates to provide a partially concealed storage position for the tie and convenient manipulation and locking of the tie down.

SUMMARY OF THE INVENTION

The invention provides sleeves for the support arms of a heavy duty bike rack and also an elastic tie down system for the support arms.

Grooves are formed in place in the sleeves for locating and positively positioning the bicycle frames in a spaced support arrangement. The support arm sleeves can be elastomeric. The sleeves provide soft contact with the bike frame parts and minimize damage to the frame and frame finish. A tie down includes an elastic cord which has one end anchored in the support tube. The free end has a knob or anchor which is stored in a socket at the end of the support arms. The knob facilitates manual release and fastening of the tie downs. The knob has a sleeve portion which projects from the knob and interfits in the socket for both the hold down and stored position. The elastic tension on the cord maintains the knob in the socket. A longitudinal groove in the upper part of the sleeve and an aligned groove in the nose piece enables the cord to be wrapped around the arm and nose piece to be protected from accidental entanglement. The groove in the nose piece is aligned with the socket so that the elastic wrapped in the nose piece provides a direct pull on the knob to hold it in the socket.

Further objects, advantages and features of the invention will become apparent from the disclosure.

IN THE DRAWINGS

FIG. 1 is a perspective view of one embodiment of the invention showing the carrier on the rear of a vehicle.

FIG. 4 is a perspective view of a modified embodiment of the invention.

FIG. 6 is a side elevational view of a bike rack intended for use with a minivan or wagon with a support arm sleeve and tie down assembly of the invention.

FIG. 7 is a rear elevational view of the bike rack shown in FIG. 6.

FIG. 8 is a sectional view along line 8—8 of FIG. 7.

FIG. 9 is a sectional view along line 9—9 of FIG. 6.

FIG. 10 is an enlarged view of the connection of the hold down strap shown in FIG. 6.

FIG. 11 is a sectional view along line 11—11 of FIG. 6.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 3:
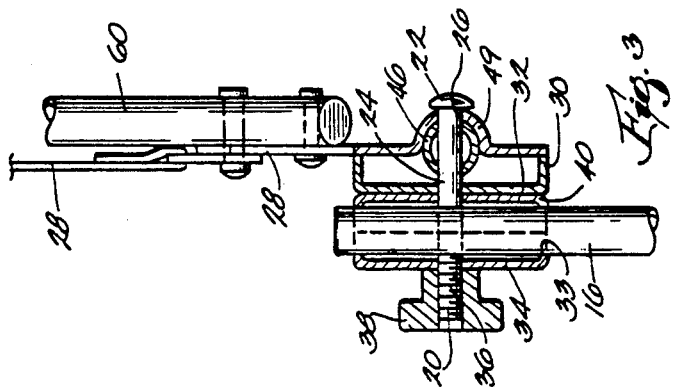
FIG. 3 is a sectional view enlarged along line 3—3 of FIG. 2.
Figure 2:
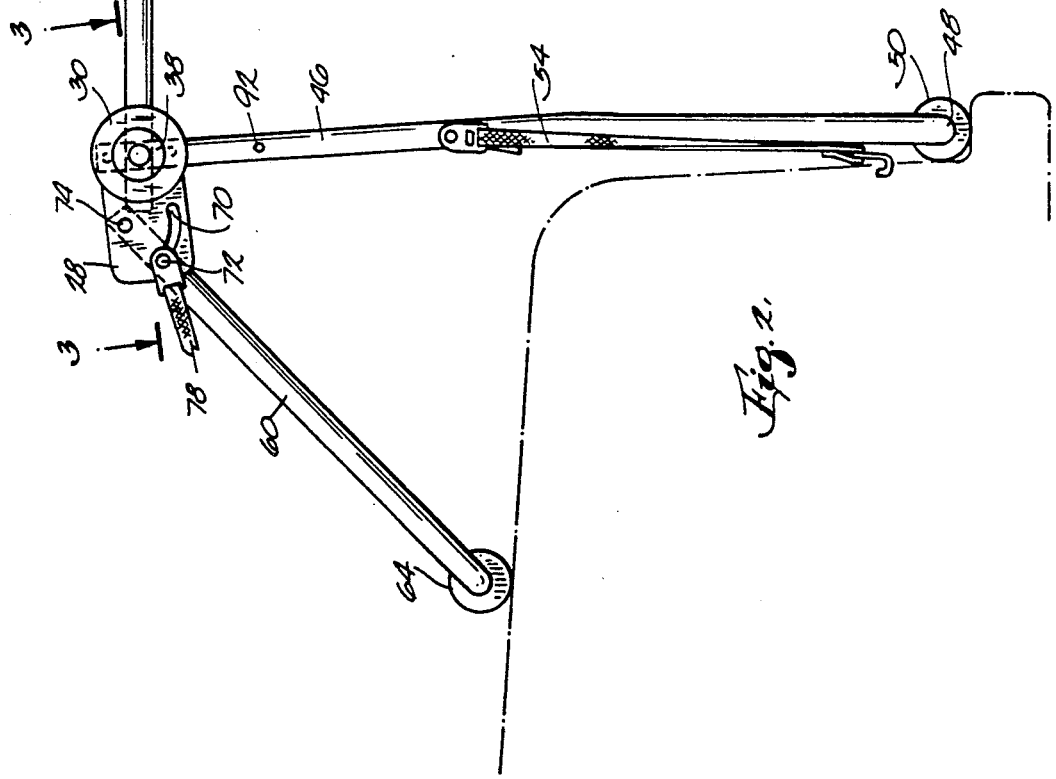
FIG. 2 is a side elevational view of the carrier shown in FIG. 1.

For the purpose of illustrating a standard trunk mounted bike rack, FIGS. 1-5 are included. These figures show ordinary tubing support arms with no cooperatively associated tie downs. Support arms such as are illustrated in U.S. Pat. No. 4,394,948 incorporated herein by reference could also embody the invention. The rotary mounting means for the arms could be in accordance with the '948 patent or U.S. Pat. No. 4,830,250 incorporated herein by reference. In FIG. 1 an accessory rack 10 is shown supported on the rear of a vehicle 12. The bike or load is supported on support arms 14 and 16. Rotary mounting means are provided to afford selective rotary positions of the arms 14 and 16 about a rotary axis 18 for each arm 14, 16. In the disclosed construction the rotary axes are provided by bolts 20 having heads 22 and shaft portions 24 which extend through aperture 26 in spaced plates 28 (FIG. 3). The bolts 20 also extend through fixed hubs 30 and through two rotatable hub halves 32 and 34 which are assembled in allochiral or clam shell relationship about support arms 16. Opposed notches 33 in hub halves 32 and 34 form a round aperture on a diameter line for embracing the support arms 14, 16. The bolts have a threaded portion 36 which threadably receive a manual lock nut 38 used for tightening and releasing the position of the support arms 16. Locking means in the form of teeth are provided on the fixed hub 31 which project axially toward the adjacent face of hub half 34. The rotary hubs 34 have mating interfitting teeth 40 which enable relative rotation when the nut 38 is loose of the movable hub 34 with respect to the fixed hub 30 to provide the adjustment angle, preferably a generally horizontal position of the arms 14, 16, as illustrated in FIG. 2.

The attachment means for supporting the support arms to the vehicle includes the rear legs 46 which in the embodiment illustrated in FIGS. 1 and 2 includes a connecting web 48 which forms a U-shaped frame made up of the legs 46 and connecting web section 48. The composite leg can be provided with rubber bumpers or pads 50 arranged around the legs and the web tube 48. Straps 54 can be provided for securing the legs 46 to the vehicle in accordance with the teachings of U.S. Pat. Nos. 4,394,948 and 4,513,897, the disclosures of which are incorporated herein by reference. The connection of the rear legs 46 to the plates includes channels 49 in the plates 28 having a curvature complementary to the curvature of the leg tubes 46 so that the leg tubes interfit in the channels 49. This connection prevents rotation of the legs 46 relative to the plates about the axis provided by bolts 20. None of the prior art cited herein employs the channel fastening technique which provides a stronger connection than two rivets 21, 22 as shown in FIG. 1 of the '897 patent. In addition, the curved metal which defines the channels strengthens the plates so they won't bend or distort under the heavier loads of mountain bikes.

The attachment means also includes forward legs 60 which in FIG. 1 are connected by a web portion 62 to make a second U-shaped frame. Cushions or pads 64 can be employed on tube 62. Means are provided for securing the legs 60 to the plates 28. In the disclosed construction the means include slots 70 in the plates, headed pins 72 which are movable in the slots 70 and rivets 74 which provide fixed pivots for the legs 60 relative to the plate 28 and the rear legs 46. This type of fastening technique of the upper legs is illustrated in the '948 patent. Securing straps 78 can be employed as shown in FIG. 1 and also the FIGS. 1 and 2 of the '948 patent with clips to engage the upper panel of the hood.

FIG. 4 shows a modified embodiment of the accessory rack of the invention which employs individual padded feet on the support legs rather than U-shaped those frames. In this respect the feet correspond to disclosed in U.S. Pat. No. 4,513,897. The feet have U-shaped brackets 80 provided with pads 82 and also double feet 84 which are commonly pivoted about pivots 86. In the FIG. 4 embodiment the rotary support means for the support arms is the same as that illustrated in FIGS. 1, 2 and 3.

The assembly hereinabove described is rigidified by use of a cross tube 90 which can be bolted by bolts 92 to the forward leg tubes or welded or otherwise secured In use of the invention the legs or U-shaped frames would be appropriately adjusted to rest on the vehicle parts and the straps adjusted to secure the frame in place. The support arms can then be adjusted to a horizontal position by loosening the nuts 38 and swinging the arms as the projections or teeth on the hubs skip to the selected angular position. The nuts are then tightened to maintain the support arms 16 in a fixed relationship.

Figure 5A:
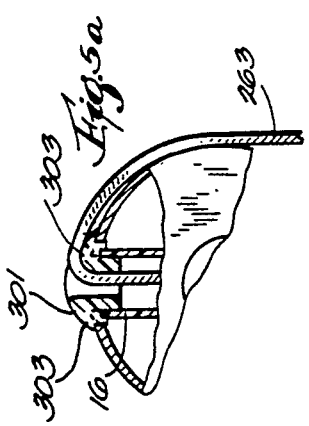
FIG. 5A is an enlarged view of the end of the support arm shown in FIG. 5.
Figure 5:
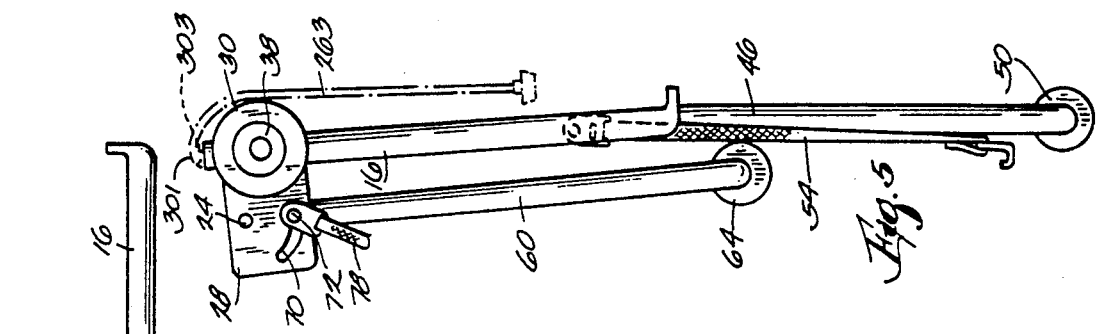
FIG. 5 is a side elevational view of the bike rack in FIG. 1 collapsed.

FIG. 5 shows a collapsed position of the carrier. Location of the pivot axis on the center of the rear legs results in a compact folded position.

The preferred embodiment of the bike rack disclosed in this application shown in FIGS. 6-11 is adapted for use with square end vehicles such as minivans, wagons or the like. The bike support arms 250 are the legs of a U-shaped frame with a connecting tube portion 253.

To provide rigid support for the bike rack, the rack is connected to the gap between the top of the rear vehicle door or window and adjacent the door or window frame. In this regard, the upper ends 210 of the lower frame members 212 receive lengths of tubing 214 of a diameter less than the diameter of tubing 212. The tubes 214 have a bend or angle to form two angularly related portions. The upper ends 218 interfit in the lower ends of the upper mounting tubes 220. The upper tubes have forwardly extending angled end portions 222 and a downwardly depending flange portion 224 which is adapted to interfit in the gap 226 between a rear door 228 and body 230.

The tube 214 is telescopically related to tube 220 and interfits thereto and bolts or spring loaded pins 232 and apertures 233 (FIG. 11) can be employed to secure tube 218 and tube 220 at the adjusted length which fits the vehicle. The lower tube 212 has an inwardly and forwardly extending section 236 which enables the end of the leg to fit into the corner 238 between the bumper 240 and the door 228. Thus, the telescopic adjustment capability enables proper positioning of the frame between the vehicle bumper and top of the door. An elastomeric sleeve 237 can be employed at the bottom of the frame around tubes 236 and bottom tube 241.

In accordance with the invention, the bike rack shown in FIGS. 6, 7 and 8 is provided with a U-shaped frame 254 with two support arms 252 which receive support arm sleeves 250. The sleeves 250 are secured in place by plastic or metal end or nose pieces 256 which are pinned to the bike support tube 252 by cross pins 258. Alternatively, as shown in Figure 8, the nose piece can be pinned by a vertical pin or rivet 259 which extends through a vertical aperture 261 which opens in the groove 263 in the nose piece 256. The bottom of the rivet or the rivet head can be located at 279. Thus, the elastic cord 270 will conceal the upper end of the pin or rivet in the groove 263 and the knob 276 conceals the lower end of the rivet. As shown in FIGS. 6, 7, 8 and 10, a hold down elastic cord or shock cord 270 is provided which has an end 272 anchored as shown in FIG. 10 in the top of the rear of tube 252 by a knot 257 and washer 261 in the tube 252. The free end of the hold down elastic cord 270 is provided with an anchor or knob 276 which has a small diameter annular shoulder or sleeve 278 which interfits in a socket aperture 280 in the nose piece. That is the storage position and hold down position for the knob. The knob has a recess 281 for a knot on the cord.

The support arm sleeves shown in FIGS. 6, 7 and 8 are desirably made from a PVC rubber with a durometer of 50 to 60. Other elastomeric material can be employed Transverse grooves or recesses 251, 253 and 255 are molded in place for bike storage. A longitudinal locating groove 291 on the top of the sleeve extends the full length of the sleeve and is in the same plane and in alignment with the curved groove 263 in the nose piece. Thus, the elastic cord 270 is wrapped around the support arm sleeve and nose piece for the stored position The groove 291 positions and retains the cord against accidental displacement and this maintains appropriate tension on the knob so that the entire hold down system is drawn or taut and not loose when in the storage position. The elastic cord and support sleeve system of the invention can also be employed on the individual support arms of the type shown in FIGS. 1-5. In this embodiment the support arm tubes are not connected by a cross tube such as 253 which combine with the supports 250 to make a U-shaped frame. The elastic cord 263 is connected to the end of the tube 16 as shown with a plastic bushing 301 (FIG. 5). The bushing 301 fits in the end of tube 16 and can have a flange 303 which abuts the rotary locking washers. The bushing has a groove 303 providing a locating channel for the elastic cord. The washers beneath the elastic cord rotate with the support arm as the support arm is moved about its pivot. Thus, there is no change in tension on the cord during sliding of the support arm The means for locking the support arms in the desired position comprises two half shell hub portions 280 and 282 and hub portions 284 and 286 also employed in the FIG. 1 embodiment.

I claim:

1. An accessory carrier for a motor vehicle comprising a pair of elongated support arms for supporting a load remote from the vehicle,
    means for supporting said support arms in a selected position,
    a frame for supporting said carrier on a vehicle and
    elastomeric sleeves on said support arms, said sleeves having transverse recess for positioning a load; a first longitudinal groove extending along the length of the top of each of said sleeves said grooves being interrupted by said recesses, and means on the end of said support arm for securing said sleeve on said support arm, said securing means having a groove in alignment with said first groove, and an elastic hold down cord on each of said arms affixed at one end to one end of its associated arm, adapted to be trained in said grooves, and releasably attachable at the opposite end to the opposite end of said associated arm.

2. The accessory carrier of claim 1 wherein said means for securing said sleeve is a rigid end piece which includes means defining a socket, said elastic cord having parts at the free end thereof which interfit in said socket to retain said core under tension in a storage mode and in a hold down mode.

3. The accessory carrier of claim 2 wherein said groove in said end piece is downwardly curved and said cord is provided at its free end with a knob which has a small diameter projecting sleeve and said end piece has a downwardly open aperture which receives said sleeve so that said elastic cord is tensioned or stretched about said curved groove in said end piece to put a pulling force on said knob to hold it against said end piece.

4. The accessory carrier of claim 1 including rotary locking means for positioning said support arms in a selected position, said locking means having annular locking washers supported on a common axis and wherein said elastic cord is wrapped around said annular locking washers so that said elastic cord swings with said support arms and the washers during adjustment of the angular position of the support arm so that there is no change in tension on the elastic cord.

5. The improvement of claim 3 wherein said knob has a large ring portion with a recess surrounding a central aperture, and said cord has a knot located in said recess.

6. In an accessory carrier for a motor vehicle comprising a pair of support arms for supporting a load remote from the vehicle,
    mounting means for supporting said support arms for rotation of the support arms into any one of a plurality of defined angular positions,
    a frame for mounting said carrier on a vehicle, the improvement comprising hold down means associated with at least one of said support arms, said hold down means including an elastic cord having a fixed end secured to the end of said support arm proximal to the vehicle and an end piece on the distal end of said support arm, said end piece having a curved portion with a groove for receiving said cord aligned with a longitudinal groove in a sleeve on said arm that falls in a vertical plane through the length of the support arm, said longitudinal groove being interrupted by recesses n the sleeve on said arm that are adapted to receive a portion of a bicycle frame for transportation, and means on the distal end of said cord releasably interfitting in a downwardly open aperture in said end piece.

* * * * *

UNITED STATES PATENT AND TRADEMARK OFFICE
CERTIFICATE OF CORRECTION

PATENT NO. : 5,118,020

DATED : June 2, 1992

INVENTOR(S) : Giancarlo Piretti

It is certified that error appears in the above-identified patent and that said Letters Patent is hereby corrected as shown below:

Column 5, line 21:

Delete "recess" and substitute ---recesses--.

Column 5, line 37:

Delete "core" and substitute ---cord---.

Column 6, line 35:

After "recesses" delete "n" and substitute ---in---.

Signed and Sealed this

Fifth Day of October, 1993

Attest:

BRUCE LEHMAN

Attesting Officer     Commissioner of Patents and Trademarks